April 11, 1961  E. SALZER  2,979,644
PROTECTION FOR SEMICONDUCTOR POWER DIODES
Filed May 13, 1960
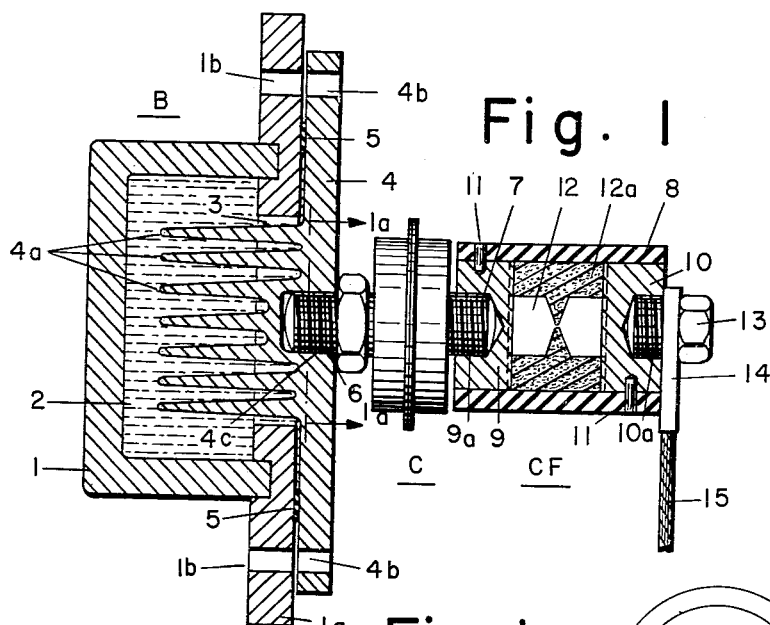
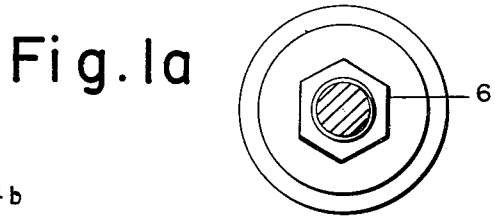
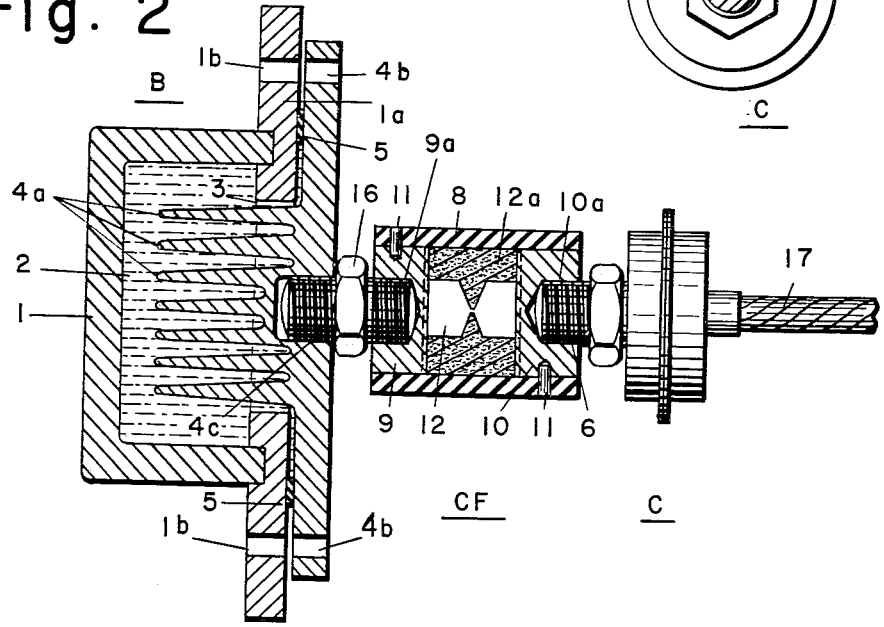
INVENTOR.
Erwin Salzer

United States Patent Office 2,979,644
Patented Apr. 11, 1961

2,979,644
PROTECTION FOR SEMICONDUCTOR POWER DIODES

Erwin Salzer, Waban, Mass., assignor to The Chase-Shawmut Company, Newburyport, Mass.

Filed May 13, 1960, Ser. No. 29,000

7 Claims. (Cl. 317—234)

This invention is concerned with semiconductor rectifiers, and more particularly with large rectifiers of that description comprising numerous semiconductor rectifier cells connected in parallel into electric circuits.

Some semiconductor rectifiers such as, for instance, rectifiers comprising germanium cells, or silicon cells, or other rectifier cells involving a relatively small mass and intended to operate at relatively high current densities requires co-called cell fuses to protect sound cells from the over-currents resulting from the breakdown of any given cell in such a rectifier. Cell fuses must be current-limiting, must perform a very critical task and must, therefore, be precision engineered and carefully constructed.

Each cell in a semiconductor rectifier has a predetermined damage $i^2 \cdot t$ which is a constant value, and each cell fuse must be designed and constructed in such a way that the clearing $i^2 \cdot t$ thereof is less than the damage $i^2 \cdot t$ of the cell to be protected by the fuse. This coordination of $i^2 \cdot t$ values is known as matching of the cell and the cell fuse. If there is a mismatch of cell and cell fuse the fuse may blow unnecessarily and thereby impair the continuity of service, or the cell fuse may fail to blow when it should blow and be responsible for destruction of a smaller or larger number of cells likely to result in interruption of service. It is thus apparent that perfect matching of the constituent cells of a rectifier and of the cell fuses thereof is a matter of crucial importance.

The behavior of a cell fuse is characterized by its fusing $i^2 \cdot t$ and its total clearing $i^2 \cdot t$. For practical purposes a fixed ratio may be assumed to exist between these two values. Both the total clearing $i^2 \cdot t$ and the fusing or melting $i^2 \cdot t$ of a given cell fuse must be less than the damage $i^2 \cdot t$ of the rectifier cell to be protected by the cell fuse.

The damage $i^2 \cdot t$ of the cell as well as the fusing $i^2 \cdot t$ of the cell fuse depend upon the initial temperature of the two devices, i.e. upon whether the two devices are initially hot or cold, and on ambient temperature conditions. Hence any given damage and fusing $i^2 \cdot t$ value must expressly, or impliedly, refer to an initial temperature condition.

It occurs quite frequently in connection with conventional semiconductor rectifier structures that the cells and the cell fuses are initially perfectly matched or balanced but become subject to different heating and cooling conditions when built into and forming an integral part of the rectifier and operating inside of the rectifier.

It is, therefore, one object of this invention to provide means which tend to preclude a relative change of the damage $i^2 \cdot r$ of the cells and of the fusing $i^2 \cdot t$ of the cell fuses when operated inside of a rectifier structure.

Another object of the invention is to provide means precluding unnecessary blowing of cell fuses and precluding failure of cell fuses to blow when they ought to blow in order to protect the cells for the protection of which they are intended.

Another object of the invention is to provide means precluding interruptions of service resulting from failure of cell fuses to perform as such fuses are supposed to perform.

Large semiconductor rectifiers are generally provided with convection cooling systems such as forced air cooling systems or circulating liquid cooling systems. If these cooling means maintain the temperature of the cells relatively fixed irrespective of the load current they carry and if these cooling means fail to cool the cell fuses in a fashion similar to their cooling action upon the cells, then the initial match of the damage $i^2 \cdot t$ of the cells and of the fusing $i^2 \cdot t$ of the cell fuses becomes ineffective, and the cell fuses tend to blow prematurely, i.e. under load conditions which do not warrant blowing thereof.

It is, therefore, another object of the invention to provide convection cooled semiconductor rectifiers wherein the cells and the cell fuses are subjected to similar or the same cooling conditions.

Cell fuses have fusible elements of silver because silver combines a relatively high conductivity with a relatively small fusing $i^2 \cdot dt$. In one type of cell fuses the fusible elements of silver are provided with an overlay of a low fusing point metal adapted, on fusion thereof, to sever the base metal by a metallurgical reaction or alloying between the overlay metal and the base metal. Such cell fuses have been described in considerable detail in U.S. Patent 2,921,250 to K. W. Swain, Coordinated Static Power Rectifiers and Current-Limiting Fuses, issued January 12, 1960, and reference may be had to this patent for additional details on this type of cell fuses. It is desirable, in order to achieve the time current characteristic best adapted for effective cell protection, to apply for cell protection fuses having a fusible element which is coated wholly or in part with a low fusing point metal. This, however, greatly reduces the temperature difference between normal operating temperature and blowing temperature. As a result of that reduction of temperature range changes in ambient temperature are likely to affect more critically the operation of cell fuses having fusible elements or fuse links of this character than the operation of cell fuses whose links are made of silver and lack any overlay of an alloy forming link-destroying low fusing point metal.

It is, therefore, another object of this invention to provide means for compensating the relative sensitivity of cell fuses having fusible elements comprising overlays of the aforementioned character to ambient temperature conditions, i.e. ambient cooling or heating conditions.

Further objects and advantages of the invention will become apparent as this description proceeds, and the features of novelty which characterize the invention will be pointed out with particularity in the claims annexed to, and forming part of, this specification.

For a better understanding of the invention reference may be had to the accompanyind drawing wherein Fig. 1 shows a cross-section of a hollow water cooled bus structure supporting a semiconductor rectifier cell and a cell fuse;

Fig. 1a is a section along 1—1 of Fig. 1; and

Fig. 2 refers to a modification of the structure of Fig. 1 and shows a water cooled bus structure supporting a semiconductor rectifier cell and a cell fuse in a fashion somewhat different from that shown in Fig. 1.

Large semiconductor rectifier structures comprising convective cooling means have been described in numerous publications and therefore do not need to be described here. For information on that subject reference may be had to such publications, e.g. Transaction Paper 58–219 of The American Institute of Electrical Engineers, by I. K. Dortort, Current Balancing Reactors for Semiconductor Rectifiers. The drawings and the following description are limited to the changes made in conventional semiconductor rectifier design.

Referring now to the drawings, and more particularly to Figs. 1 and 1a thereof, reference character B has been applied to generally indicate a hollow liquid-cooled bus bar, reference character C has been applied to generally indicate a semiconductor diode and reference character CF has been applied to generally indicate a current-limiting cell fuse. The bus bar C comprises duct-defining means 1 adapted to contain a body of flowing cooling liquid 2. Front plate 1a of bus 1 has a plurality of openings 3 of which but one is shown in Fig. 1. Opening 3 is covered by a plate 4 provided with cooling fins 4a. The front plate 1a and the cover plate 4 are provided with registering holes 1b, 4b for inserting screw-threaded bolts (not shown) for screwing plate 4 against plate 1a. A gasket 5 is arranged between front plate 1a and cover plate 4 to preclude cooling liquid inside of bus B from leaking out between plates 1a and 4. Plate 4 forms an internally screw-threaded recess 4c. The semi-conductor power diode C may be a silicon diode, e.g. a high current silicon 4JA60–4JA61 cell. Such diodes comprise a pair of terminals of which one is generally formed by a screw-threaded plug and the other by a braid. The silicon diode shown in Fig. 1 is provided with two terminals in the form of screw-threaded plugs 6, 7. Plug 6 is screwed into recess 4c formed by plate 4. The current-limiting cell fuse CF comprises a casing 8 of insulating material closed on both ends by terminals in the form of plugs 9, 10 held in position by transverse steel pins 11. The axially inner surfaces of plugs 9, 10 are grooved and the fusible element 12 is inserted into these grooves with the axially outer ends thereof. A body 12a of quartz sand surrounds the fusible element 12. Fusible element 12 is formed by a ribbon of silver having two lateral V-shaped incisions defining a point of restricted cross-section which forms a point heat source when ribbon 12 is carrying current. The entire surface of ribbon 12 may be tin plated for reasons set forth in detail in the above referred to patent to K. W. Swain. The left plug terminal 9 is provided with a screw-threaded recess 9a into which the screw-threaded plug connector 7 of power diode C enters. The right plug terminal 10 is provided with a screw-threaded recess 10a into which a hex screw 13 enters clamping lug 14 provided with a braid 15 against the axially outer surface of plug 10. To facilitate heat exchange between cell C and the coaxial cell fuse CF the diameter of screw-threaded connector plug 7 which enters into the internally screw-threaded recess 9a of plug 9 must be relatively large. Parts 7, 9 integrate cell C and current-limiting cell fuse CF into a thermal unit or stack which is characterized by its ability to readily exchange heat between the constituent elements thereof.

In the structure of Figs. 1 and 1a the operating temperature of the cell fuse CF is directly or immediately affected by the cooling action to which the power diode C is subjected, and the relation between the temperature of the cell fuse CF and that of the cell C remain substantially constant. The relation between pre-heating of the power diode C and that of the cell fuse CF remaining substantially constant, the initial match of the $i^2 \cdot t$ values of both circuit elements remains effective, and thus the cell fuse keeps on properly performing its function irrespective of changes in ambient conditions including changes in the cooling action of the coolant flowing through bus structure B.

The bus structure shown in Fig. 2 is identical to that shown in Fig. 1 and in both figures the same reference characters have been applied to indicate like parts. Therefore there is no need of describing again the bus structure B shown in Fig. 2. The arrangement of Fig. 2 includes a cell fuse CF and a cell C. The cell fuse CF comprises a tubular casing 8 closed on both ends thereof by terminal plugs 9, 10, held in position by transverse steel pins 11 and conductively interconnected by silver ribbon 12 defining a point of drastically reduced cross-section. Plug 9 is provided with an internally screw-threaded recess 9a into which the right screw-threaded end of a plug connector 16 enters. The left screw-threaded end of plug connector 16 is screwed into the internally screw-threaded recess 4c of cover plate 4. Plug 10 is provided with an internally screw-threaded recess 10a into which the screw-threaded terminal plug 6 of power diode C enters. The other terminal of power diode C is in the form of a braid 17. The link or fusible element of cell fuse CF is submersed in a body 12a of quartz sand which has a relatively high thermal conductivity and tends to readily transfer the heat generated in power diode C to cover plate 4 and to the cooling liquid flowing past the cooling fins 4a on cover plate 4.

It will be understood that I have illustrated and described herein two preferred embodiments of my invention and that various alterations may be made therein without departing from the spirit and scope of the appended claims.

I claim as my invention:

1. A rectifier assembly comprising a semiconductor rectifier cell having a pair of terminal elements, a current-limiting cell fuse having a pair of terminal elements and being arranged in coaxial relation to said cell, one of said pair of terminal elements of said cell and one of said pair of terminal elements of said cell fuse being directly joined by screw-thread means of relatively large diameter forming integral parts of said one of said pair of terminal elements of said cell and of said one of said pair of terminal elements of said cell fuse, said screw-thread means being adapted to promote heat exchange between said cell and said cell fuse and to integrate said cell and said cell fuse into a thermal unit.

2. A rectifier assembly comprising a semiconductor rectifier cell having a pair of terminal elements including a screw-threaded connector plug; a current-limiting cell fuse including a tubular casing, a pair of terminal plugs plugging the ends of said casing, a conductor including a portion of silver conductively interconnecting said pair of terminal plugs and an overlay of an alloy-forming metal having a substantially lower fusing point than silver on said portion of said conductor; one of said pair of terminal plugs having an internally screw-threaded recess receiving said screw-threaded connector plug.

3. A rectifier assembly comprising a semiconductor rectifier cell; a current-limiting cell fuse including a tubular insulating casing arranged in coaxial relation to said cell, a pair of terminal plugs closing said casing and a fusible element conductively interconnecting said pair of terminal plugs; a first pair of cooperating screw-threaded male and female surfaces one on said cell and one of said pair of plugs establishing an electric series connection between said cell and said cell fuse and uniting said cell and said cell fuse into an integral stack structure, joint fluid cooling means for said cell and said cell fuse arranged on one end of said stack structure, and a second pair of cooperating screw-threaded male and female surfaces for attaching said stack structure to said joint fluid cooling means.

4. A rectifier assembly comprising a semiconductor rectifier cell having a pair of coaxial screw-threaded connector plugs; a fluid-cooled hollow bus having a female screw-threaded surface cooperatively engaged by one of said pair of connector plugs of said cell; a current-limiting cell fuse including a tubular insulating casing arranged in coaxial relation to said cell and to said pair of connector plugs thereof, a pair of terminal plugs closing said casing and fusible element conductively interconnecting said pair of terminal plugs; and one of said pair of terminal plugs of said cell fuse having an internally screw-threaded recess cooperatively engaged by the other of said pair of connector plugs of said cell.

5. A rectifier assembly comprising a semiconductor rectifier cell having a screw-threaded plug connector; a current-limiting cell fuse including a tubular insulating casing arranged in coaxial relation to said cell and to said plug connector thereof, a pair of terminal plugs closing said casing and a fusible element conductively interconnecting said pair of terminal plugs, one of said pair of terminal plugs having a screw-threaded plug connector and the other of said pair of terminal plugs having an internally screw-threaded recess cooperatively engaged by said plug connector of said cell; and a fluid-cooled hollow bus having a recessed screw-threaded surface cooperatively engaged by said plug connector on one of said pair of terminal plugs of said cell fuse.

6. A rectifier assembly comprising a semiconductor rectifier cell having a screw-threaded plug connector; a current-limiting cell fuse including a tubular insulating casing arranged in coaxial relation to said cell and to said plug connector thereof, a pair of terminal plugs closing said casing and a fusible element conductively interconnecting said pair of terminal plugs, one of said pair of terminal plugs having a screw-threaded plug connector and the other of said pair of terminal plugs having an internally screw-threaded recess cooperatively engaged by said plug connector of said cell; a fluid-cooled hollow bus defining an opening, and a cover plate for said opening having an inner surface and an outer surface, said inner surface forming a system of cooling fins and said outer surface defining an internally screw-threaded recess cooperatively engaged by said plug connector on one of said terminal plugs of said cell fuse.

7. A self-protected rectifier unit comprising a semiconductor rectifier cell having a screw-threaded plug connector; a current-limiting cell fuse including a tubular insulating casing arranged in coaxial relation to said cell and to said plug connector thereof, a pair of terminal plugs closing said casing and a fusible element conductively interconnecting said pair of terminal plugs; one of said pair of terminal plugs defining an internally screw-threaded recess cooperatively engaged by said screw-threaded plug connector of said cell.

No references cited.